May 6, 1958 J. J. SLOYAN 2,833,598
ANTI-FRICTION SUPPORT
Filed March 8, 1954 2 Sheets-Sheet 1
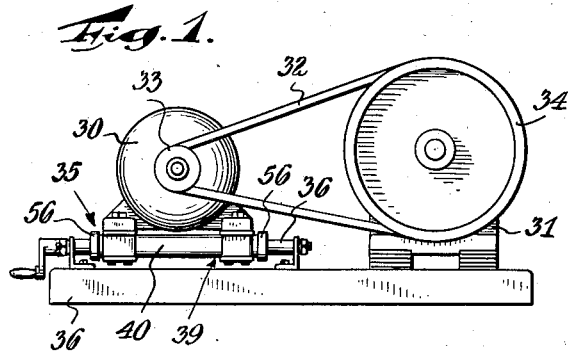
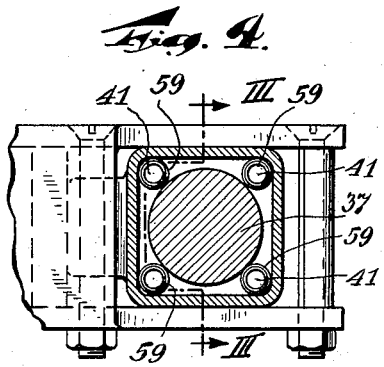
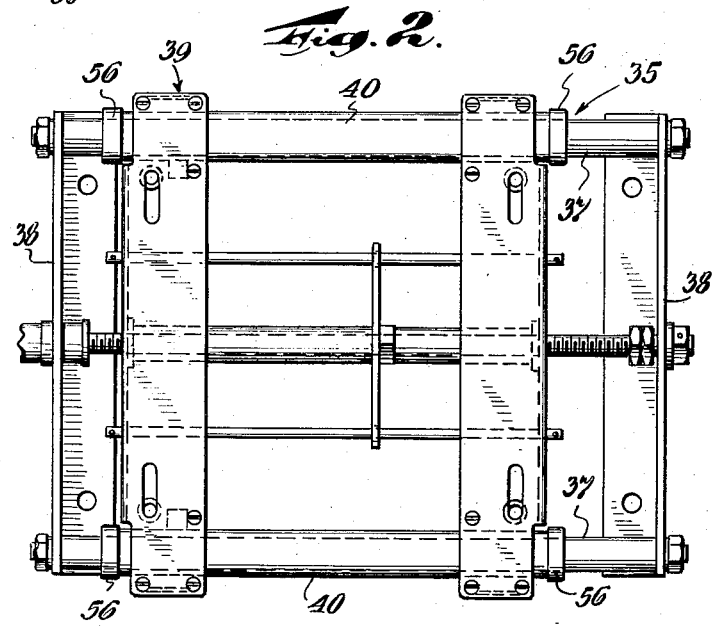
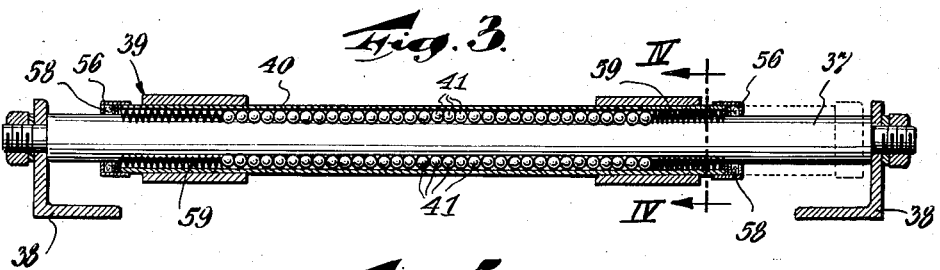
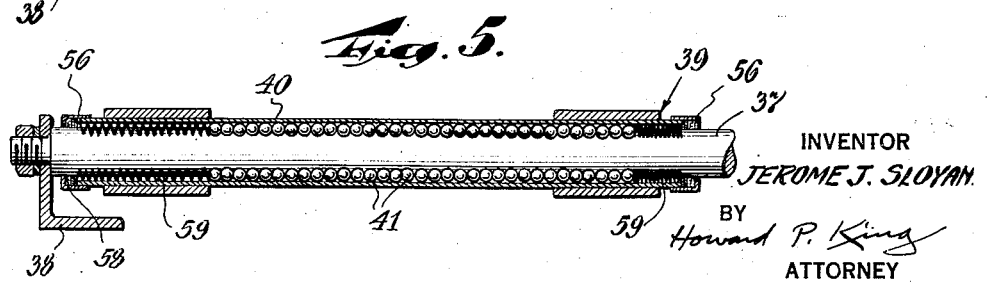
INVENTOR
JEROME J. SLOYAN
BY Howard P. King
ATTORNEY May 6, 1958 J. J. SLOYAN 2,833,598
ANTI-FRICTION SUPPORT
Filed March 8, 1954 2 Sheets-Sheet 2
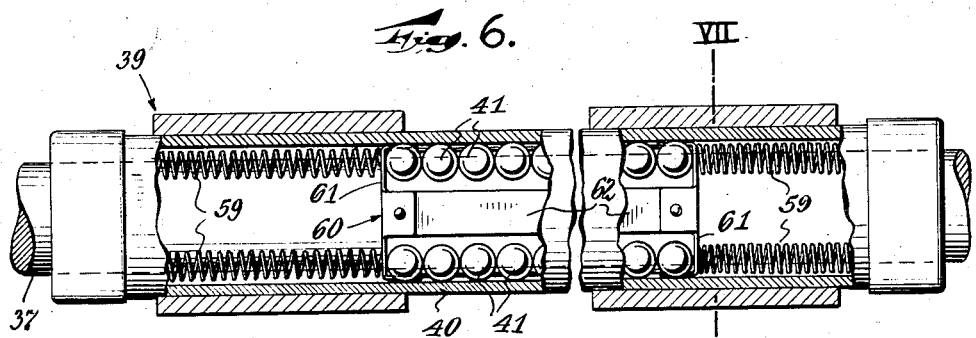
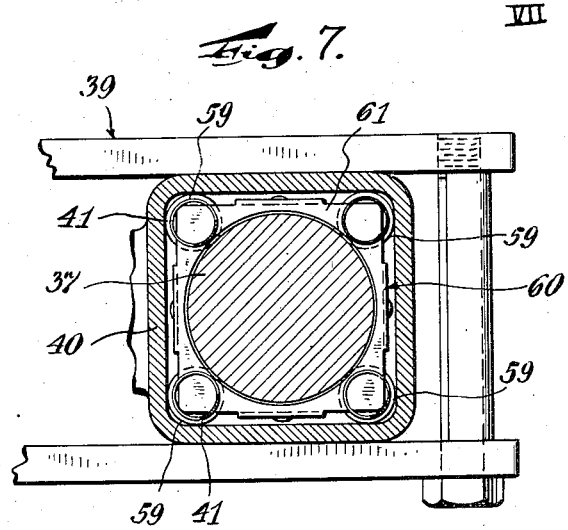
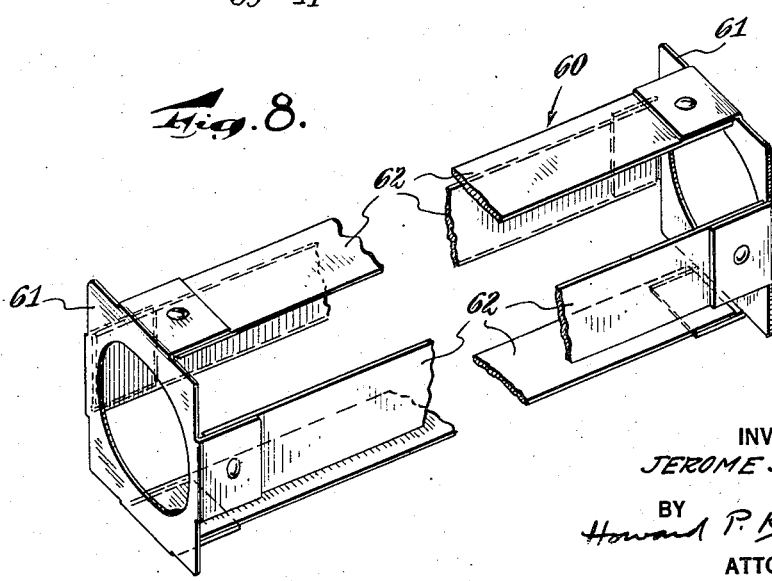
INVENTOR
JEROME J. SLOYAN.
BY Howard P. King
ATTORNEY

United States Patent Office 2,833,598
Patented May 6, 1958

2,833,598

ANTI-FRICTION SUPPORT

Jerome J. Sloyan, Trenton, N. J.

Application March 8, 1954, Serial No. 414,771

4 Claims. (Cl. 308—6)

This invention relates to slidable supports and more particularly to that type such as is shown in my prior application S. N. 117,999, filed September 27, 1949, now Patent No. 2,762,663, wherein a carriage is provided having a limited movement longitudinally of a track or rail.

Both the invention of said prior application and of the present disclosure have utility in association with various instrumentalities of diverse character of which reciprocating tables for milling machines, typewriter carriages, motor supports, gun recoil mounts and other devices will suffice as illustrative, and of which the motor support has been arbitrarily selected for purpose of specific showing in the accompanying drawings. The essential characteristic of the support of the present invention and of the prior application common to the numerous uses, is that the movable portion or carriage has linear movement within maximum limits and must slide with minimum friction throughout the prescribed range of its permitted reciprocation.

It was pointed out in the previous application, and is equally true with respect to the present disclosure, that the structure involved shall have a capability of free operation under severe load conditions and readily respond to sudden and quick shifts of load or position of the carriage on the rails. An example equally applicable here as in the prior application is the now commonplace employment of motor driven instrumentalities which are belt driven and in which the tension of the belt or adjustment of the belt for purpose of speed differential are often provided. As a specific example, I may again refer to the popular variable speed drive using a V-shaped belt with pulleys correspondingly grooved, of which one, and usually the driving pulley, is constructed in such manner that its pitch diameter can be varied at will without stopping the motor. That pulley is essentially two cones or frustrums of cones axially aligned and spring loaded to keep the groove formed thereby for belt engagement of maximum pitch diameter, but with the cones adapted to be slid one from the other by tension applied to the belt wedging the belt deeper between the cones and thus obtaining belt engagement at a less diametrical distance from the cone axis. The wedging of the belt is accomplished by displacing the motor further from the driven instrumentality. It is consequently essential that the motor may be moved readily since the speed control of the driven instrumentality is a function of motor location and change of location of the driving and driven pulleys with respect to each other.

Common to the prior application and to the present invention is the utilization of a fixed rail upon which is mounted a longitudinally movable glider, constituting a part of the carriage, with series of balls interposed at longitudinal corners of the glider between the glider and rail for the purpose of providing anti-friction reciprocation of the glider on the rail. In both instances, each longitudinal corner of the glider constitutes a raceway for a series of balls, but the raceway is not completely filled with balls, thus providing voids of adequate length to permit the balls to roll for the necessary distance to accommodate the range of displacement or longitudinal movement of the glider with respect to the rail. Theoretically, the displacement of the balls in rolling is substantially half of the longitudinal displacement of the glider with respect to the rail, but actually varies slightly from this theoretic dimension since the balls do not ride on the glider surface directly diametrically to the riding of the balls on the rail. Since this difference is small compared to the actual distance of transition of the balls, the description, for simplicity, will refer to the displacement of the balls as substantially half of the displacement of the glider.

Both the prior application and the present disclosure utilize end caps 56 on the glider for purpose of confining the ends of the raceways and thereby intended to keep the balls always between the glider and the rail. Under what may be termed ideal circumstances, namely, where a preloading condition exists, the relative positions of the balls, rails and gliders, when once properly arranged, would be maintained due to the fact that the balls would always be under compression and held in place in rolling contact with both the glider and rail. However, this ideal condition does not always exist, and the present invention proposes corrective measure therefor. The absence of the ideal condition may be explained as resulting, for instance, by unavoidable presence, under economical manufacturing exigencies, of appreciable clearance actually existing between one or more of the series of balls and the rail surface and raceway.

Suppose, for example, that preloading of all series of balls between the raceways and rail had not been accomplished (which is generally true), and the support is mounted or used with the rails standing vertically, it is probable that the balls would drop, not roll to the lower end of the rider, and if the support were inverted, the balls would drop to the other end of the rider. In either event, if the operation then requires the glider to move upward, the balls should be capable of rolling downward with respect to the glider, but actually would not be able to do so since they are already against the bottom end cap, and consequently would not function as anti-friction devices and might indeed force the end cap off of the glider and spill the balls. Again, suppose the balls had for some reason acquired a position at one end of the glider and the support is, nevertheless, used with the rail and glider positioned horizontally, the same adverse condition would again prevail when the glider attempts to move in a direction away from the end of the rail where the balls are assembled.

Where only the weight of the rider and the motor or other piece of machinery mounted thereon is considered, only the upper series of balls would be affected by the downward gravitational force, but since the belt tension applies a tilting force longitudinally of the glider, a resultant pressure in practice will be applied to some of the balls of the upper series and to some of the balls of the lower series. Consequently, under this set of circumstances, there is a requirement for the balls of all of the series to roll toward the end cap located next to the ends of the several series of improperly situated balls, thus resulting in a great liklihood of the balls forcing the retaining cap off of the end of the glider.

The situations above described might well happen in the ordinary course of events. For example, while a support having a construction of my previous application is transported, like all freight, it is manhandled and at least subjected to vibration and jolts, and if the balls are loose in their raceways (and it is more than likely that they will be) they might easily find their way to one end of the glider, and quite possibly to the end most undesirable for operational purposes and detrimental to the proper functioning and assembly of the balls in the glider.

In addition to the broad concept of the invention of proposal to provide corrective measures for the improper operation and detrimental effects, the invention contemplates an inherent control for location of the series of balls in the raceways of the glider.

Somewhat more specifically, the invention provides for maintaining the series of balls in a spaced relation from the end caps until positively moved toward one or the other end cap in normal operation of the glider.

A further object of the invention is to avoid unintentional displacement of the balls from desired relation thereof to the glider.

Yet another object of the invention is to provide means normally locating the balls away from the ends of the raceways and preferably evenly from both ends, until positively actuated in use toward one end or the other by movement of the glider.

Another object of the invention is to hold the balls yieldably in the preferred location so as to be operationally movable therefrom by movement of the glider.

Other objects of the invention will appear to persons skilled in the art to which it appertains as the description proceeds, both by direct recitation thereof and by implication from the context.

Referring to the accompanying drawings, in which like numerals of reference indicate similar parts throughout the several views;

Figure 1 is a side elevation of the support of my invention, upon which is carried a motor having a belt drive to a driven instrumentality;

Figure 2 is a plan of said support of my invention;

Figure 3 is a longitudinal sectional view of a glider in operative position upon a rail and showing my invention incorporated therewith, the section being taken upon two planes as indicated by line III—III of Fig. 4;

Figure 4 is a cross-section on line IV—IV of Fig. 3;

Figure 5 is a longitudinal sectional view similar to Fig. 3, and showing the glider as moved to one end of its range of movement as occurs in operational use of the support;

Figure 6 is another longitudinal section of the character of Fig. 3, and showing another modification wherein the balls are retained in associated relation by a clip;

Figure 7 is a cross-section on line VII—VII of Fig. 6; and

Figure 8 is a perspective view of said clip.

As an arbitrarily selected exemplification of the invention in one use thereof, the general organization of Fig. 1 illustrates an electric motor 30 driving any desired instrumentality 31 through the agency of a belt 32 and pulleys 33 and 34, said pulleys being respectively on the shafts of said motor and instrumentality. The pulley 34 on the motor is shown of the known type which expands and contracts in an axial direction for locating the belt at a desired pitch circle of the pulley for speed variation of drive for the pulley of the fixed instrumentality. In general, the motor is representative of a movable or adjustable mechanism.

The present invention resides primarily in the construction of a support 35 for the said mechanism. As shown, a bed 36 is provided to which the fixed instrumentality is secured and to which a fixed portion of the support of the present invention is also secured, it being understood that said bed is representative of any structure such as a floor, table, wall, shelf, ceiling or the like which will afford relatively fixed mounting for the aforementioned fixed instrumentality and fixed portion of the support.

The fixed portion of the support as herein illustrated comprises two parallel rails 37 the ends of which are made fast to transverse cleats 38 which may conveniently be formed from appropriate lengths of angle iron one flange of which forms a foot resting upon and adapted to be secured to bed 36 and the other flange of which stands perpendicularly and constitutes an end abutment and rigid support for the said rails. The assembly of rails and cleats forms a rectangle of which the cleats will be arbitrarily referred to as at the ends and the rails as at the sides of the rectangular assembly constituting the fixed or basal portion of the support.

The movable portion of the support comprises a carriage 39 having slidable movement longitudinally of the rails, said carriage having gliders 40 at its opposite side margins cooperating with the rails to not only provide for sliding of the carriage on the rails, but to also keep the carriage assembled upon the rails. Each rail has a cross-sectional configuration differing from that of the glider of such character that longitudinal raceways for anti-friction means, such as balls 41 are provided between the rails and gliders. As shown, the rails have a circular cross-section and the gliders are rectangular in cross-section so that the raceways are constituted at the longitudinal corners of the gliders. The carriage has a limited longitudinal movement, the range or amplitude thereof being confined by engagement of the ends of the carriage against the upright flanges of cleats 38 or other suitable stop.

It is essential that the balls 41 be free to roll, since if prevented from rolling they merely serve as inert inserts between the rail and glider and as such would provide literally substantially the same amount of friction as if the glider directly engaged the rail. Since the normal displacement of the balls along the rail will be substantially equal to one half of the displacement of the glider along the rail and in the same direction as the displacement of the glider; and since the displacement of the balls along the glider will be substantially equal to one half of the displacement of the glider, but in a direction opposed to the direction in which the glider is displaced, voids are provided in the races to provide more than a sufficient space lengthwise of the races to enable the balls to roll without interruption for the full displacement of the glider on the rail between its limiting stops.

Preferably terminating each end of each glider, is an end cap 56 which is hollow and fixed in any suitable manner upon the glider and perforate at its outer end to slidably pass the rail therethrough. Suitable packing 58 may be included within the end cap so that lubricant many be retained within the glider.

Yieldable means 59 are provided within the glider next to the ends thereof for centralizing the balls 41 as a group or series lengthwise of the glider. According to the showing herein, the yieldable means comprises a coil spring in a void at each end of each raceway. Thus with the rectangular cross-section of glider shown in those figures, there will be four springs at each end of the glider. The far ends of these springs bear against the packing within the end caps. In Figures 3, 4 and 5, the inward ends of the springs bear against the end ball of the series of balls in the several raceways, said springs having a diameter substantially the same as the diameters of the balls so as to function freely in the raceways. The strength of each spring is chosen to be able to support the weight of the series of balls in the raceway without materially compressing the spring should the glider be stood vertically, but capable of being compressed by the push applied by the balls when rolling under influence of longitudinal displacement of the glider with respect to rail in operation of the device.

The modification of Figures 6 to 8 has some practical advantages over the other constructions shown, particularly for larger sizes of supports. This embodiment includes provision of a clip or spider-frame 60 which is just long enough to accommodate the several series of balls 41 between end plates 61 of the clip. Said end plates are held in fixed parallel relation one to the other by slats 62 which are located between the rail and glider in parallelism thereto. The springs, such as 59, at each end of the glider bear against plates 61 and have appropriate strength as a yieldable means at each end of the glider which will support the weight of the clip and the several series of balls should the glider be positioned vertically. It may also be appropriate to now state that in all forms shown, the voids of the raceways not only accommodate the rolling requirements for the series of balls, but also accommodate the springs so that the springs will not prevent full amplitude of ball movement.

At the time of assembly of the support of this invention, all of the series of balls are arranged to occupy the centralized portions of the raceways, and the glider is located at the mid poistion between its stops. Then in use, the balls have the necessary voids for travel in either direction as the glider travels to its destination. Since the device rarely has a use where the applied force is purely a gravitational vertical force, but is usually a combination of forces comprised, for instance, by weight of the motor, reactive torque, force due to projection of the motor shaft, pull on the pulley, and so forth, and thus all of the series of balls will be somewhere under compression between the glider and rail and will all be subjected to rolling action when the glider moves. However, there may be instances, momentarily or otherwise, when one or two of the series of balls or portions of the series are not under compression. This therefore presents a possibility of the balls in one or more of the series of balls in Figs. 3 to 5 not rolling in agreement with the balls of another series. To avoid this possibility, the constructions of Figs. 6 to 8 have an advantage of applying impetus to any series in which the balls are loose to cause that series to likewise be moved when another series is forced to roll.

I claim:

1. A support comprising a cylindrical rail, a rectangular glider movable longitudinally of said rail, said glider having four walls contiguous pairs of which form corners and provide corner spaces between said glider and rail thereby constituting a plurality of longitudinal raceways, series of balls in said raceways with the balls in each raceway contacting the said contiguous walls of the glider thereat and contacting the cylindrical surface of said rail, and each said series being of less length than the respective raceway containing the series of balls and leaving voids at both ends of each series of balls, and yieldable means in the ends of said raceways entirely within said voids and maintained aligned each with its series of balls by confinement in its respective raceway, said yieldable means adapted to apply forces effective on the ends of said series of balls in said raceways and longitudinally of and aligned with each of said series of balls.

2. A support in accordance with claim 1, wherein said yieldable means comprises an individual longitudinally coiled spiral spring entirely in each said void, the diameter of said spring being substantially equal to the diameters of said balls.

3. A support in accordance with claim 1, wherein each said yieldable means is effective upon only a single series of balls located in the same raceway in which said spring is located.

4. A support in accordance with claim 1, wherein a clip is provided common to all of the series of balls and locating all of said series of balls simultaneously at the same longitudinal position on said rail and in said glider, and wherein said yieldable means at corresponding ends of said series of balls apply cumulative force at an end of said clip.

References Cited in the file of this patent

UNITED STATES PATENTS

| 2,198,039 | Onions et al. | Apr. 23, 1940 |
| 2,269,254 | Cribb | Jan. 6, 1942 |
| 2,605,622 | Anderson | Aug. 5, 1952 |

FOREIGN PATENTS

| 37,862 | France | Feb. 4, 1931 |
| 844,540 | Germany | July 21, 1952 |